US012162360B2

(12) United States Patent
Kirchhoff et al.

(10) Patent No.: US 12,162,360 B2
(45) Date of Patent: Dec. 10, 2024

(54) ELECTRIC MARINE PROPULSION SYSTEM AND CONTROL METHOD

(71) Applicant: Brunswick Corporation, Mettawa, IL (US)

(72) Inventors: Thomas S. Kirchhoff, Waupaca, WI (US); Jason S. Arbuckle, Horicon, WI (US)

(73) Assignee: Brunswick Corporation, Mettawa, IL (US)

( * ) Notice: Subject to any disclaimer, the term of this patent is extended or adjusted under 35 U.S.C. 154(b) by 438 days.

(21) Appl. No.: 17/404,410

(22) Filed: Aug. 17, 2021

(65) Prior Publication Data

US 2023/0054361 A1    Feb. 23, 2023

(51) Int. Cl.
*B60L 15/20*       (2006.01)
*B60L 1/00*        (2006.01)
(Continued)

(52) U.S. Cl.
CPC .............. *B60L 15/20* (2013.01); *B60L 1/003* (2013.01); *B60L 1/02* (2013.01); *B60L 1/14* (2013.01);
(Continued)

(58) Field of Classification Search
CPC .. B60L 15/20; B60L 1/003; B60L 1/02; B60L 1/14; B60L 2200/32;
(Continued)

(56) References Cited

U.S. PATENT DOCUMENTS 6,342,775 B1    1/2002   Sleder, Sr.
6,507,164 B1 *  1/2003   Healey ................... H02P 29/02
                                              318/599

(Continued)

FOREIGN PATENT DOCUMENTS

CN      103708015 B    6/2016
GB        2569351 A    6/2019
(Continued)

OTHER PUBLICATIONS

Ledden et al., "Systems and Methods for Planning Consumption of Power by Devices Aboard a Marine Vessel," Unpublished U.S. Appl. No. 16/923,866, filed Jul. 8, 2020.

(Continued)

*Primary Examiner* — Luis A Martinez Borrero
(74) *Attorney, Agent, or Firm* — Andrus Intellectual Property Law, LLP (57) ABSTRACT

A method of controlling an electric marine propulsion system configured to propel a marine vessel and powered by a power storage system includes presenting on a user interface a plurality of power mode options selectable by a user, including at least a reduced power and an emergency power mode. Upon selection of the reduced power mode by the user, at least one auxiliary devices utilizing power from the power storage system is automatically turned off and the propulsion system is controlled so as not to exceed a first speed limit. Upon selection of the emergency power mode by the user, the at least one auxiliary device utilizing power from the power storage system is turned off and the propulsion system is controlled so as not to exceed a second speed limit that is lower than the first speed limit.

23 Claims, 6 Drawing Sheets

(51) Int. Cl.
*B60L 1/02* (2006.01)
*B60L 1/14* (2006.01)
*B63H 1/14* (2006.01)
*B63H 21/17* (2006.01)
*B63H 21/21* (2006.01)

(52) U.S. Cl.
CPC .............. *B63H 1/14* (2013.01); *B63H 21/17* (2013.01); *B63H 21/21* (2013.01); *B60L 2200/32* (2013.01); *B60L 2240/12* (2013.01); *B60L 2240/421* (2013.01); *B60L 2250/16* (2013.01); *B60L 2260/20* (2013.01)

(58) Field of Classification Search
CPC ........... B60L 2240/12; B60L 2240/421; B60L 2250/16; B60L 2260/20; B63H 1/14; B63H 21/17; B63H 21/21
See application file for complete search history.

(56) References Cited

U.S. PATENT DOCUMENTS

| | | | |
|---|---|---|---|
| 6,652,330 B1 | 11/2003 | Wasilewski | |
| 6,885,919 B1 | 4/2005 | Wyant et al. | |
| 6,902,446 B1* | 6/2005 | Healey | H02K 23/66 |
| | | | 318/599 |
| 6,919,704 B1* | 7/2005 | Healey | H02J 7/0034 |
| | | | 440/73 |
| 7,218,118 B1 | 5/2007 | Gonring | |
| 7,306,496 B1* | 12/2007 | Carmen | B63H 20/007 |
| | | | 440/6 |
| 7,355,436 B2* | 4/2008 | Zehentner | H02H 7/0838 |
| | | | 324/765.01 |
| 7,385,365 B2 | 6/2008 | Feick | |
| 7,486,489 B2* | 2/2009 | Dragoi | H02P 7/2825 |
| | | | 361/23 |
| 8,043,132 B1 | 10/2011 | Wyant | |
| 8,606,443 B2* | 12/2013 | Pandit | B60W 20/00 |
| | | | 180/65.21 |
| 8,608,521 B1 | 12/2013 | Snyder et al. | |
| 8,725,329 B1 | 5/2014 | Snyder et al. | |
| 8,836,544 B1 | 9/2014 | Balogh | |
| 8,942,919 B2* | 1/2015 | Uyeki | G01C 21/3469 |
| | | | 701/414 |
| 9,037,325 B2* | 5/2015 | Lu | B60L 1/02 |
| | | | 180/65.28 |
| 9,054,555 B1 | 6/2015 | Ward | |
| 9,362,838 B1 | 6/2016 | Balogh et al. | |
| 9,533,747 B2 | 1/2017 | Arbuckle et al. | |
| 9,739,624 B2 | 8/2017 | Rajagopalan et al. | |
| 9,966,895 B1* | 5/2018 | Deuel | H02P 11/04 |
| 9,994,296 B1* | 6/2018 | Balogh | B63B 79/10 |
| 10,295,355 B2 | 5/2019 | Baglino et al. | |
| 10,513,322 B2* | 12/2019 | Clark | B63H 20/007 |
| 10,573,098 B2 | 2/2020 | Mash | |
| 10,604,222 B1* | 3/2020 | Salisbury | B63H 21/21 |
| 10,654,551 B1* | 5/2020 | Doremus | B63B 1/246 |
| 10,717,509 B2* | 7/2020 | Schroeder | B63H 20/14 |
| 10,723,430 B2 | 7/2020 | Raimondi | |
| 10,953,972 B2* | 3/2021 | Schroeder | B63H 20/08 |
| 11,008,085 B2* | 5/2021 | Sargazikoosheh | H02P 8/32 |
| 2004/0090195 A1* | 5/2004 | Motsenbocker | B60L 58/25 |
| | | | 318/109 |
| 2004/0263099 A1* | 12/2004 | Maslov | B60L 50/20 |
| | | | 318/400.24 |
| 2008/0081521 A1 | 4/2008 | Takashi | |
| 2008/0246338 A1* | 10/2008 | Donnelly | B61C 7/04 |
| | | | 307/53 |
| 2009/0140700 A1* | 6/2009 | Eberhard | B60L 58/27 |
| | | | 320/162 |
| 2009/0282840 A1* | 11/2009 | Chen | F25J 1/004 |
| | | | 60/671 |
| 2011/0087391 A1* | 4/2011 | Pandit | B60W 50/0097 |
| | | | 903/903 |
| 2012/0053772 A1* | 3/2012 | Lu | B60L 1/02 |
| | | | 903/903 |
| 2012/0083173 A1* | 4/2012 | McMillan | B63H 21/20 |
| | | | 903/930 |
| 2012/0109515 A1* | 5/2012 | Uyeki | G01C 21/3469 |
| | | | 701/423 |
| 2012/0143410 A1* | 6/2012 | Gallagher | B60L 58/12 |
| | | | 701/22 |
| 2013/0221916 A1* | 8/2013 | Kelty | B60L 58/24 |
| | | | 320/109 |
| 2013/0241485 A1 | 9/2013 | Snyder | |
| 2014/0094998 A1* | 4/2014 | Cooper | B61L 15/0036 |
| | | | 701/2 |
| 2015/0005995 A1 | 1/2015 | Caouette | |
| 2015/0291036 A1* | 10/2015 | Ryu | B60L 7/18 |
| | | | 701/22 |
| 2016/0014252 A1* | 1/2016 | Biderman | A61G 5/04 |
| | | | 701/29.2 |
| 2016/0059949 A1* | 3/2016 | Rebele | B63H 20/02 |
| | | | 440/6 |
| 2017/0176195 A1 | 6/2017 | Rajagopalan et al. | |
| 2021/0152105 A1* | 5/2021 | Froelich | B60K 17/34 |
| 2022/0072962 A1* | 3/2022 | Maury | G06F 16/21 |
| 2022/0169349 A1* | 6/2022 | Jesewitz | B63H 11/08 |
| 2022/0194542 A1* | 6/2022 | Kirchhoff | B63H 21/21 |
| 2022/0314818 A1* | 10/2022 | Bernatchez | B62M 27/02 |
| 2022/0332398 A1* | 10/2022 | Bernatchez | B60L 7/10 |
| 2022/0363136 A1* | 11/2022 | Bruneau | H02P 3/00 |
| 2023/0053671 A1* | 2/2023 | Gonring | B60L 50/60 |
| 2023/0219675 A1* | 7/2023 | Janeczko | B60L 58/12 |
| | | | 440/6 |
| 2023/0219676 A1* | 7/2023 | Kalnins | B60L 15/20 |
| | | | 701/21 |

FOREIGN PATENT DOCUMENTS

| | | | | |
|---|---|---|---|---|
| JP | 2015033967 A | | 2/2015 | |
| JP | 3230878 U | | 2/2021 | |
| KR | 101466320 B1 | | 11/2014 | |
| KR | 101864570 B1 | | 6/2018 | |
| TW | 201 823 105 A | * | 7/2018 | ............. B60L 50/15 |
| WO | 2011079870 A1 | | 7/2011 | |

OTHER PUBLICATIONS

Ledden et al., "Systems and Methods for Automatically and Intelligently Reducing the Power Consumption of Devices," Unpublished U.S. Appl. No. 17/009,412, filed Sep. 1, 2020.
Ledden et al., "Automatic Load Shedding for Poor Incoming Power Quality," Unpublished U.S. Appl. No. 16/936,849, filed Jul. 23, 2020.
Fergus et al., "Systems and Methods for Preserving Electrical Power in a Marine Vessel Having a Marine Propulsion Device," Unpublished U.S. Appl. No. 16/721,027, filed Dec. 19, 2019.
EP22187658.4, Extended European Search Report dated Jan. 30, 2023, 8 pages.
Examination Report from corresponding European Application No. 22187658.4, mailed Aug. 13, 2024.

* cited by examiner

ELECTRIC MARINE PROPULSION SYSTEM AND CONTROL METHOD

BACKGROUND

The following U.S. patents provide background information and are incorporated herein by reference, in entirety.

U.S. Pat. No. 6,507,164 discloses a trolling motor having current based power management including: an electric motor; a motor controller having an output for providing voltage to the motor; and a current sensor for measuring the electrical current flowing through the motor. Upon determining that the trolling motor has been operating above its continuous duty limit for a predetermined period of time, the motor controller begins reducing the voltage output to the motor until reaching an acceptable output voltage. In another embodiment, the controller is operated in three distinct modes with three distinct sets of operating parameters, namely: a normal mode wherein the output is set to a commanded level; a current limit mode wherein the output is set to a safe, predetermined level; and a transitional mode wherein the output is incrementally changed from the predetermined level to the commanded level.

U.S. Pat. No. 6,652,330 discloses a method for controlling the electrical system of a marine vessel which comprises the steps of measuring a battery potential, comparing the battery potential to a threshold voltage magnitude, and then disconnecting one or more of a plurality of electrical power consuming devices when the voltage potential is less than the threshold voltage magnitude. This is done to avoid the deleterious condition wherein an engine of the marine vessel is operating at idle speed and attempting to charge the battery while a plurality of electrical power consuming devices are operating and drawing sufficient current from the alternator to prevent the proper charging of the battery. In these circumstances, the battery potential can actually be depleted as the battery attempts to provide the additional required electrical current for the loads.

U.S. Pat. No. 6,885,919 discloses a process is provided by which the operator of a marine vessel can invoke the operation of a computer program that investigates various alternatives that can improve the range of the marine vessel. The distance between the current location of the marine vessel and a desired waypoint is determined and compared to a range of the marine vessel which is determined as a function of available fuel, vessel speed, fuel usage rate, and engine speed. The computer program investigates the results that would be achieved, theoretically, from a change in engine speed. Both increases and decreases in engine speed are reviewed and additional theoretical ranges are calculated as a function of those new engine speeds. The operator of the marine vessel is informed when an advantageous change in engine speed is determined.

U.S. Pat. No. 6,902,446 discloses a DC motor having a motor housing and a motor controller housed within the motor housing. In a preferred embodiment the heat producing components of the motor controller are in thermal communication with the housing such that the majority of the heat produced by such components will be readily conducted to the environment in which the motor is operating. When incorporated into a trolling motor, the motor housing of the present invention will be submerged so that controller produced heat will be dissipated into the water in which the trolling motor is operated.

U.S. Pat. No. 7,218,118 discloses a method for monitoring the condition of a battery of a marine propulsion system provides the measuring of a voltage characteristic of the battery, comparing the voltage characteristic to a preselected threshold value, and evaluating the condition of the battery as a function of the relative magnitudes of the voltage characteristic and the threshold value. The voltage characteristic of the battery is measured subsequent to a connection event when a connection relationship between the battery and an electrical load is changed. The electrical load is typically a starter motor which is connected in torque transmitting relation with an internal combustion engine. The voltage characteristic is preferably measured at its minimum value during the inrush current episode immediately prior to cranking the internal combustion engine shaft to start the engine.

U.S. Pat. No. 7,385,365 discloses a method for error detection of a brushless electric motor, where at least one first motor parameter is measured or determined, and a second, estimated motor parameter is estimated on the basis of the first motor parameter. The second, estimated motor parameter is compared to a second, measured or determined motor parameter. An error of the electric motor can be found out according to the comparison.

U.S. Pat. No. 10,723,430 discloses a propeller propulsion system for a watercraft that includes at least one electric motor and a propeller which can be driven by the electric motor. The propeller is a surface piercing propeller. The propulsion system includes a box-like body having a side wall on which the electric motor is fixed and a cover part on which an outdrive of the surface piercing propeller is applied. The side wall and the cover part include holes through which a shaft of the motor and a shaft of the outdrive respectively pass. The box-like body includes means for transmission of motion from the drive shaft to the outdrive shaft, and the propulsion system includes means for fixing the box-like body to a transom of the watercraft.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one embodiment, a method of controlling an electric marine propulsion system configured to propel a marine vessel and powered by a power storage system includes presenting on a user interface a plurality of power mode options selectable by a user, including at least a reduced power and an emergency power mode. Upon selection of the reduced power mode by the user, at least one auxiliary device utilizing power from the power storage system is automatically turned off and the propulsion system is controlled so as not to exceed a first speed limit. Upon selection of the emergency power mode by the user, the at least one auxiliary device utilizing power from the power storage system is turned off and the propulsion system is controlled so as not to exceed a second speed limit that is lower than the first speed limit.

In one embodiment, an electric propulsion system configured to propel a marine vessel includes a power storage system, an electric motor powered by the power storage system, a user interface display, and a control system. The control system is configured to present on the user interface display a plurality of power mode options selectable by a user, including at least a reduced power mode and an emergency power mode. Upon selection of the reduced power mode by the user, the control system is configured to turn off at least one auxiliary device utilizing power from the power storage system and automatically control the propulsion system so as not to exceed a first speed limit. Upon selection of the emergency power mode by the user, the control system is configured to turn off the at least one auxiliary device utilizing power from the power storage system and automatically control the propulsion system so as not to exceed a second speed limit that is lower than the first speed limit.

In one embodiment, a method of controlling an electric marine propulsion system configured to propel a marine vessel and powered by a power storage system includes engaging a reserve power amount such that the charge level of the power storage system is not permitted to fall below the reserve power amount unless a user instructs use of the reserve power amount. Upon engaging a reserve power mode power mode option wherein the reserve power amount is preserved, an available power amount is determined as the charge level of the power storage system minus the reserve power amount and the available power amount is be displayed on the user interface.

In one embodiment, an electric propulsion system configured to propel a marine vessel includes a power storage system, an electric motor powered by the power storage system, a user interface display, and a control system. The control system is configured to prevent a charge level of the storage system from becoming less than a reserve power amount unless a user instructs use of the reserve power amount. The control system may be configured to determine an available power amount as a current charge level of the power storage system minus the reserve power amount and to display the available power amount on the user interface.

In one example, the amount of power preserved as the reserve power amount is selectable by a user, wherein the system is configured to present on the user interface at least one reserve power value selectable by a user to set the reserve power amount.

In one example, the reserve power amount is a percentage of a usable battery capacity within the safe operating area (SOA) or is an energy amount above the minimum SOA prescribed for the particular LI battery.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

The present inventors have recognized that electric marine propulsion poses additional challenges and safety concerns as compared to electric propulsion for land vehicles. One such challenge that is magnified or increased for marine propulsion is that of battery range and effectively managing range anxiety and battery utilization for users of marine vehicles. Being stranded in a body of water due to insufficient battery is concerning for a user of a marine vessel, and tends to be more so than for a user of a land vehicle because the user cannot easily exit the vessel and may not be in a situation to easily call for or access help. For this reason, users report having increased anxiety when operating electric marine propulsion systems, and particularly may have heightened concerns regarding maintaining sufficient battery power to reach their destination and/or reach shore. Accordingly, the inventors developed the disclosed system and method that assists the user in utilizing battery power for an electric marine propulsion system that includes functions and safety features to prevent a user from inadvertently or unknowingly running it out of battery power during operation.

In certain embodiments, the disclosed electric marine propulsion system and control method utilizes multiple user-selectable modes that automatically control battery power usage, such as when the charge level of the power storage system becomes low. The system may be configured to present power mode options to a user at appropriate times, such as once the battery power reaches a threshold charge level, wherein the various power modes automatically turn off one or more auxiliary devices that utilize power and/or control the propulsion system to save and more efficiently use the remaining battery power for propelling the marine vessel a maximum distance. For example, upon selection of a reduced power mode by a user, the system may be configured to automatically turn off at least one auxiliary device utilizing power from the power storage system and to control the propulsion system so as not to exceed a first speed limit.

Alternatively or additionally, the system may be configured to receive selection of an emergency power mode by the user, where the emergency power mode utilizes or permits utilization of even less battery power per unit distance than the reduced power mode. Upon engaging the emergency power mode, the system may be configured to turn off one or more auxiliary devices using power from the power storage system and to control the propulsion system so as not to exceed a second speed limit, wherein the second speed limit is even lower than the first speed limit. The second speed limit may be set at a maximal efficiency speed for maximizing vessel distance per unit of electric power from the power storage system.

In some embodiments, the system may be configured to determine a recommended power mode based on various system parameters. For example, a recommended power mode may be determined based on a charge level of the power system. In certain embodiments, the recommended power mode may be further determined based on a range of the propulsion system, which is a distance that the propulsion system can propel the marine vessel based on a current charge level, compared to a threshold distance. The threshold distance may be a preset distance, or may be, for example, a distance to a predetermined location from the vessel's current location. For example, the predetermined location may be the vessel's starting point or may be a location designated by a user, such as a trip destination inputted by a user.

In certain embodiments, the system is configured to preserve a reserve power amount of battery power such that the charge level of the power storage system is not permitted to fall below the reserve power amount unless the user instructs utilization of the reserve power amount. The reserve power amount may be a preset amount of stored power, or may be a user-set or user-controllable value. The system may be configured such that the reserve power amount can only be utilized if user selects a reserve power utilization option, such as via a user interface on the marine vessel or a user interface element on the power storage system, and thereby expressly authorizes utilization of the remaining battery power. For example, the system may be configured to present the reserve power utilization option on the user interface only once the charge level is at reserve power amount, or alternatively at a threshold amount greater than the reserve power amount.

Figure 1:
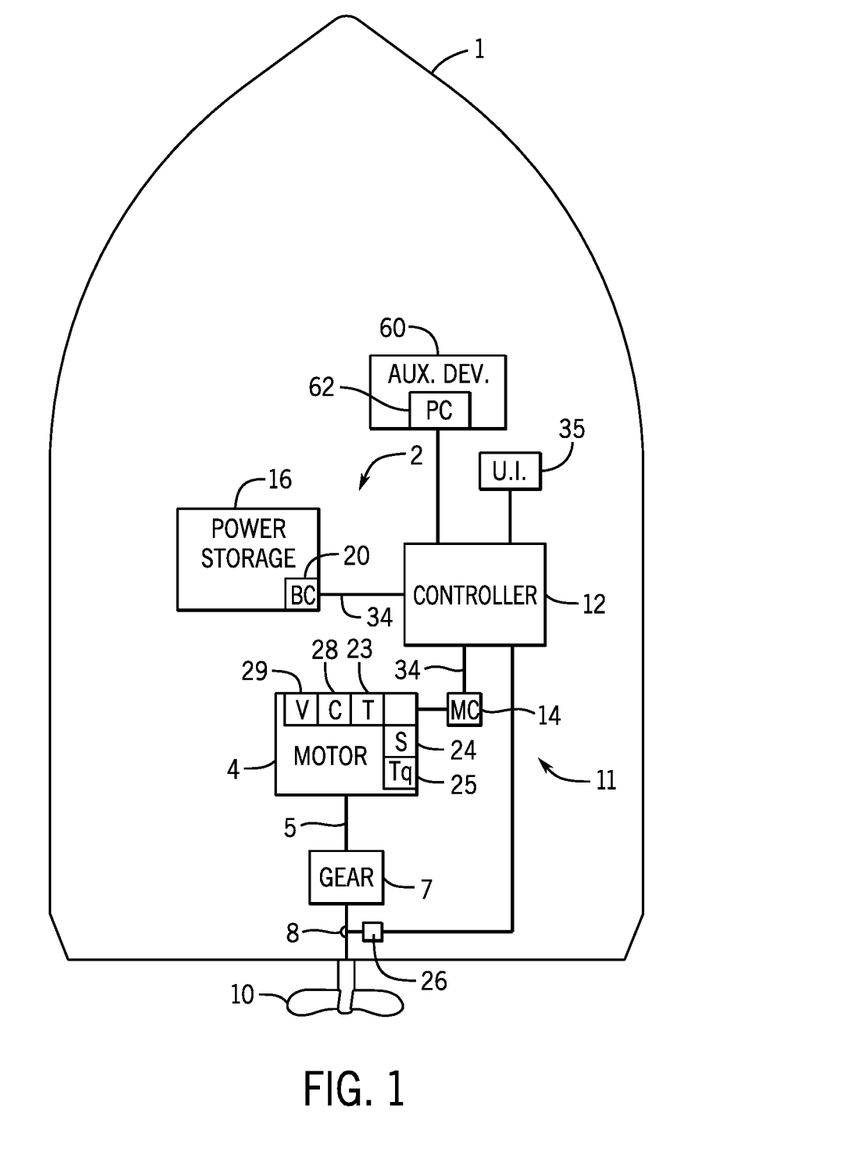
FIG. 1 is a schematic depiction of a marine vessel having an exemplary electric marine propulsion system in accordance with the present disclosure.
Figure 2:
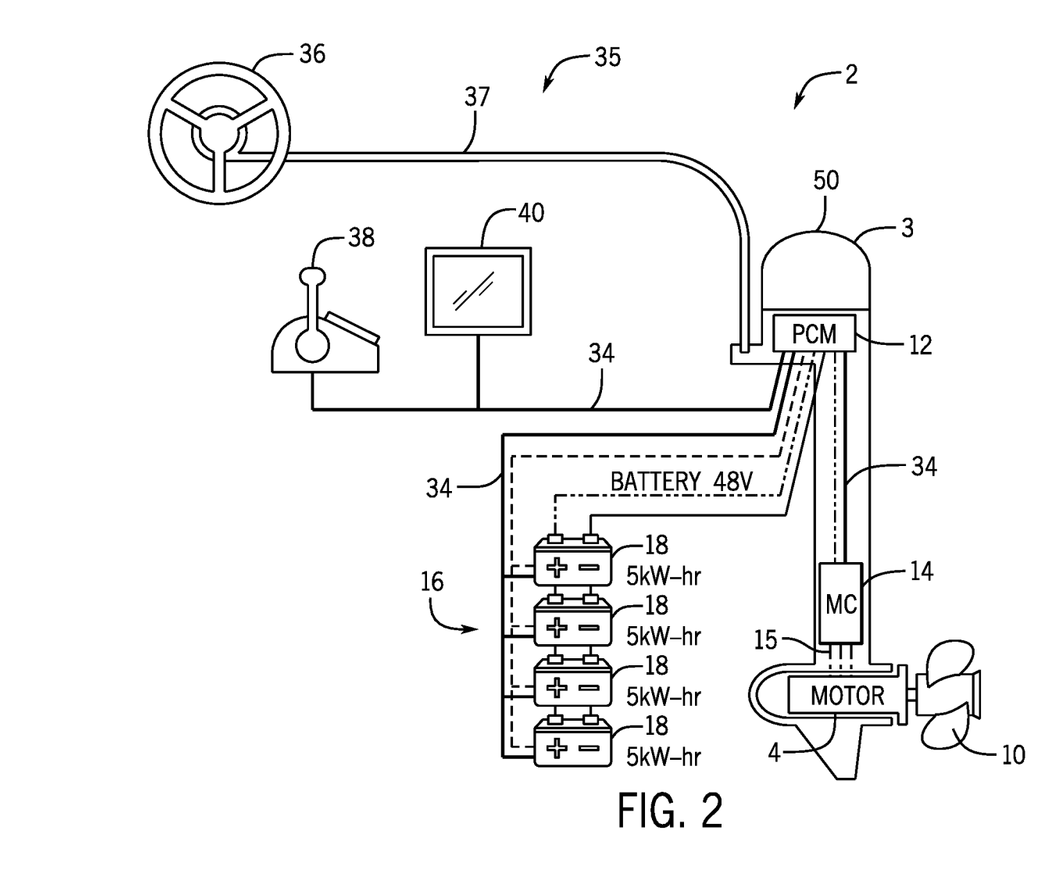
FIG. 2 is a schematic of another exemplary electric marine propulsion system in accordance with the present disclosure.

FIG. 1 depicts an exemplary embodiment of a marine vessel 1 having an electric marine propulsion system 2 configured to propel the marine vessel in a direction instructed by an operator via a steering control system, or by a guidance system configured to automatically control steering of the marine vessel to steer the vessel toward a predetermined location or global position. Referring also to FIG. 2, the electric propulsion system 2 includes at least one electric marine drive 3 having an electric motor 4 configured to propel the marine vessel 1 by rotating a propeller 10, as well as a power storage system 16, and a user interface system 35. In the depicted embodiment of FIG. 2, the electric marine propulsion system 2 includes an outboard marine drive 3 having an electric motor 4 housed therein, such as housed within the cowl 50 of the outboard marine drive. A person of ordinary skill in the art will understand in view of the present disclosure that the marine propulsion system 2 may include other types of electric marine drives, such as inboard drives or stern drives. The electric marine drive 3 is powered by the scalable storage device 16, such as including a bank of batteries 18.

A control system 11 controls the electric marine propulsion system 2. The motor 4 may be, for example, a brushless electric motor, such as a brushless DC motor. In other embodiments, the electric motor may be a DC brushed motor, an AC brushless motor, a direct drive, a permanent magnet synchronous motor, an induction motor, or any other device that converts electric power to rotational motion. In certain embodiments, the electric motor 4 includes a rotor and a stator in a known configuration.

The electric motor 4 is electrically connected to and powered by a power storage system 16. The power storage system 16 stores energy for powering the electric motor 4 and is rechargeable, such as by connection to shore power when the electric motor 4 is not in use. Various power storage devices and systems are known in the relevant art. The power storage system 16 may be a battery system including one or more batteries or banks of batteries. For example, the power storage system 16 may include one or more lithium-ion (LI) battery systems, each LI battery comprised of multiple battery cells. In other embodiments, the power storage system 16 may include one or more fuel cells, flow batteries, ultracapacitors, and/or other devices capable of storing and outputting electric energy.

The electric motor 4 is operably connected to the propeller 10 and configured to rotate the propeller 10. As will be known to the ordinary skilled person in the relevant art, the propeller 10 may include one or more propellers, impellers, or other propulsor devices and that the term "propeller" may be used to refer to all such devices. In certain embodiments, such as that represented in FIG. 1, the electric motor 4 may be connected and configured to rotate the propeller 10 through a gear system 7 or a transmission. In such an embodiment, the gear system 7 translates rotation of the motor output shaft 5 to the propeller shaft 8 to adjust conversion of the rotation and/or to disconnect the propeller shaft 8 from the drive shaft 5, as is sometimes referred to in the art as a "neutral" position where rotation of the drive shaft 5 is not translated to the propeller shaft 8. Various gear systems 7, or transmissions, are well known in the relevant art. In other embodiments, the electric motor 4 may directly connect to the propeller shaft 8 such that rotation of the drive shaft 5 is directly transmitted to the propeller shaft 8 at a constant and fixed ratio.

The power storage system 16 may further include a battery controller 20 configured to monitor and/or control aspects of the power storage system 16. The battery controller 20 may further be configured to receive information from current, voltage, and/or other sensors within the power storage system 16, such as to receive information about the voltage, current, and temperature of each battery cell or group of battery cells within the power storage system 16. For example, the battery controller 20 may receive inputs from one or more sensors within the power storage system 16, such as one or more voltage, current, and temperature sensors within a housing for the power storage system 16. Voltage sensors may be configured to sense voltage within the battery (such as cell voltage sensors configured to sense the voltage of individual cells or groups of cells in a LI battery) and one or more temperature sensors may be configured to sense a temperature within a housing of the power storage device where one or more batteries or other storage elements are located. The battery controller 20 or other controller in the system is configured to calculate a charge level, such as a state of charge, of the power storage system 16.

Each electric motor 4 may be associated with a motor controller 14 configured to control power to the electric motor, such as to the stator winding thereof. The motor controller 14 is configured to control the function and output of the electric motor 4, such as controlling the torque outputted by the motor, the rotational speed of the motor 4, as well as the input current, voltage, and power supplied to and utilized by the motor 4. In one arrangement, the motor controller 14 controls the current delivered to the stator windings via the leads 15, which input electrical energy to the electric motor to induce and control rotation of the rotor.

Sensors may be configured to sense the power, including the current and voltage, delivered to the motor 4. For example, a voltage sensor 29 may be configured to sense the input voltage to the motor 4 and a current sensor 28 may be configured to measure input current to the motor 4. Accordingly, power delivered to the motor 4 can be calculated and such value can be used for monitoring and controlling the electric propulsion system 2, including for monitoring and controlling the motor 4. In the depicted example, the current sensor 29 and voltage sensor 28 may be communicatively connected to the motor controller 14 in order to provide measurement of the voltage supplied to the motor and current supplied to the motor. The motor controller 14 is configured to provide appropriate current and or voltage to meet the demand for controlling the motor 4. For example, a demand input may be received at the motor controller 14 from the central controller 12, such as based on an operator demand at a helm input device, such as the throttle lever 38. In certain embodiments, the motor controller 14, voltage sensor 28, and current sensor 29 may be integrated into a housing of the electric motor 4, in other embodiments the motor controller 14 may be separately housed.

Various other sensors may be configured to measure and report parameters of the electric motor 4. For example, the electric motor 4 may include means for measuring and or determining the torque, rotation speed (motor speed), current, voltage, temperature, vibration, or any other parameter. In the depicted example, the electric motor 4 includes a temperature sensor 23 configured to sense a temperature of the motor 4, a speed sensor 24 configured to measure a rotational speed of the motor 4, and a torque sensor 25 for measuring the torque output of the motor 4. A propeller speed sensor 26 may be configured to measure a rotational speed of the propeller 10. For example, the propeller speed sensor 26 and/or the motor speed sensor 24 may be a Hall Effect sensor or other rotation sensor, such as using capacitive or inductive measuring techniques. In certain embodiments, one or more of the parameters, such as the speed, torque, or power to the electric motor 4, may be calculated based on other measured parameters or characteristics. For example, the torque may be calculated based on power characteristics in relation to the rotation speed of the electric motor, for example.

The various parameters of the electric propulsion system are utilized for providing user-controlled or automatically effectuated vessel power control functionality appropriate for optimizing power usage when the mount of remaining power stored in the power storage system is running low. The system may be configured to control power usage by the electric propulsion system 2 to prevent running out of power away from shore and to continue at least low speed propulsion of the marine vessel sufficient to return to shore or otherwise reach safety. If the charge level of the power storage system 16, or the available power amount based on the reserve power mode settings, drops below one or more thresholds, then the system may present the user with a plurality of power mode options selectable by a user, which may include options for a full power mode, a reduced power mode, and an emergency power mode, among others. Power to the motor 4 and the electric marine drive 3 more generally, as well as power to various auxiliary device on the marine vessel are then controlled according to the user's selected mode. Alternatively, the mode may be automatically selected and engaged by the system, such as based on the charge level of the power storage system 16, the distance of the marine vessel from shore or from a predetermined location, the energy consumption history of the electric marine drive 3, and/or other factors.

Depending on the power mode engaged, the control system 11 may be configured to control the electric marine propulsion system 2 to maximize power usage, including controlling the motor 4. For example, the control system 11 may be configured to control the motor 4 and the power storage system 16 so as not to exceed a speed limit defined for the mode. The speed limit may be imposed, for example, as a limit on the motor RPM of the electric motor 4, a propeller RPM of the propeller 10, a torque supplied by the electric motor, or as a limit on the vessel speed of the marine vessel 1. The power amount supplied to the motor 4 may be controlled accordingly, such as by limiting the current amount supplied to the electric motor based on corresponding feedback on the controlled speed variable.

The power mode limitations are governed by the control system 11, such as by the central controller 12. The electric propulsion system 2 may include a plurality of controllers communicatively connected and configured to cooperate to provide the method of controlling the electric marine propulsion system described herein. For example, the motor controller 14, battery controller 20, and central controller 12 and may cooperate as a distributed control system 11 to effectuate control of the marine propulsion system 2 as described herein such that the selected power mode limitations are implemented and the battery power of the power storage system 16 is conserved. A person of ordinary skill in the art will understand in view of the present disclosure that other control arrangements are available and that the control functions described herein may be combined into a single controller or divided into any number of a plurality of distributed controllers that are communicatively connected.

In certain embodiments, various sensing devices 23-25, 26, and 28-29, may be configured to communicate with a local controller, such as the motor controller 14 or battery controller 20, and in other embodiments the sensors 23-25, 26, and 28-29 may communicate with the central controller 12 and one or more of the motor controller 14 and or battery controller 20 may be eliminated. Controllers 12, 14, 20 (and or the sensors) may be configured to communicate via a communication bus such as a CAN bus or a LIN bus, or by single dedicated communication links between controllers 12, 14, 20.

Each controller may comprise a processor and a storage device, or memory, configured to store software and/or data utilized for controlling and or tracking operation of the electric propulsion system 2. The memory may include volatile and/or non-volatile systems and may include removable and/or non-removable media implemented in any method or technology for storage of information. The storage media may include non-transitory and/or transitory storage media, including random access memory, read only memory, or any other medium which can be used to store information and be accessed by an instruction execution system, for example. An input/output (I/O) system provides communication between the control system 11 and peripheral devices.

The central controller 12, which in the embodiment shown in FIG. 2 is a propulsion control module (PCM), communicates with the motor controller 14 via communication link 34, such as a CAN bus. The controller also receives input from and/or communicates with one or more user interface devices in the user interface system 35 via the communication link, which in some embodiments may be the same communication link as utilized for communication between the controllers 12, 14, 20 or may be a separate communication link. The user interface devices in the exemplary embodiment include a throttle lever 38 and a display 40. In various embodiments, the display 40 may be, for example, part of an onboard management system, such as the VesselView™ by Mercury Marine of Fond du Lac, Wisconsin. A steering wheel 36 is provided, which in some embodiments may also communicate with the controller 12 in order to effectuate steering control over the marine drive 3, which is well-known and typically referred to as steer-by-wire arrangements. In the depicted embodiment, the steering wheel 36 is a steer arrangement where the steering wheel 36 is connected to a steering actuator that steers the marine drive 3 by a steering cable 37. Other steer arrangements, such as various steer-by-wire arrangements, are well-known in the art and could alternatively be implemented.

The power storage system 16 may further be configured to power auxiliary devices 60 on the marine vessel 1 that are not part of the propulsion system 2. For example, the auxiliary devices may include a bilge pump, a cabin lights, a stereo system or other entertainment devices on the vessel, a water heater, a refrigerator, an air conditioner or other climate/comfort control devices on the vessel, communication systems, navigation systems, or the like. Some or all of these accessory devices are sometimes referred to as a "house load" and may consume a substantial amount of battery power.

The power consumption by some or all of the auxiliary devices may be controllable, such as by a power controller 62 associated with each controlled auxiliary device or a group of auxiliary devices. The power controller 62 is communicatively connected to the controller 12, or is otherwise communicating with one or more controllers in the control system 11, in order to control power consumption by such auxiliary devices. For example, the power controller 62 may be configured to communicate with one or more power monitoring or other control devices via CAN bus or LIN bus, and to then control operation of the auxiliary device and/or power delivery to the auxiliary device according to received instructions. For instance, the system may be configured to reduce power delivery to the device 60, or to selectively turn off the auxiliary device 60 by turning on or off power delivery to the device 60 associated with the power controller 62 when the reduced power mode and/or the emergency power mode is engaged. For instance, the power controller 62 may be configured to instruct powerdown of the auxiliary device or to otherwise cut power thereto in order to turn off the auxiliary device. Alternatively or additionally, the power controller 62 for one or a set of auxiliary devices may include a battery switch controlling power thereto. The control system 11 may thus include digital switching system configured to control power to the various auxiliary devices, such as a CZone Control and Monitoring system by Power Products, LLC of Menomonee Falls, WI. Other examples of power control arrangements are further exemplified and described at U.S. application Ser. Nos. 17/009,412 and 16/923,866, which are each incorporated herein by reference in its entirety.

The control system 11 may be configured to select certain auxiliary device(s) 60 that get turned off or otherwise controlled to reduce or eliminate power consumption by those device(s). For example, the controller 12 may be configured with a list of one or more auxiliary devices 60 that gets turned off for each power-limited mode, including the reduced power mode and the emergency power mode. The reduced power mode, for example, may be associated with a first list of one or more auxiliary devices 60 that gets turned off, and the emergency power mode may be associated with a second, more extensive, list of one or more auxiliary devices 60 that gets turned off. For example, the system 11 may be configured to turn off all auxiliary devices that are not essential to the operation of the propulsion system, and thus may include all or nearly all of the so-called house load auxiliary devices. For the reduced power mode, a portion of the house load devices may be designated to be powered down to reduce power draw from the power storage system 16. For example, those devices that are not important for optimized vessel operation, such as entertainment devices or other accessories, or those devices that draw signification power, such as climate control devices and water heaters, may be turned off when in the low power mode.

Figure 3:
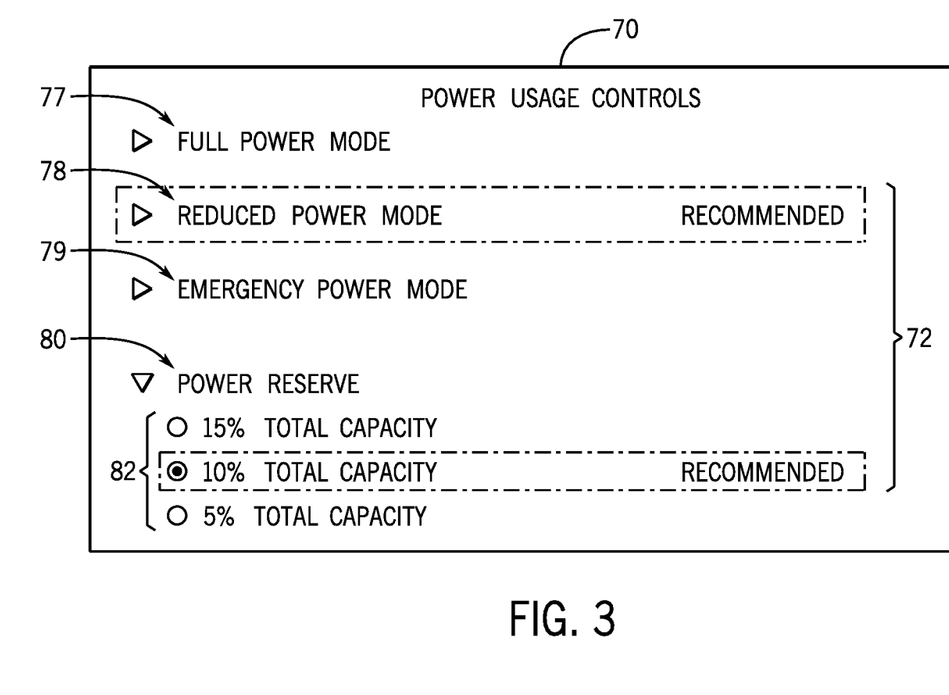
FIG. 3 is an exemplary display demonstrating an exemplary embodiment in accordance with the present disclosure.

FIG. 3 depicts an exemplary user interface display 70, such as may be shown on the display device 40 of the user interface system 35. The user interface display 70 is configured to present a plurality of power mode options selectable by a user. In the depicted example, the power mode options 72 include a full power mode option 77, a reduced power mode option 78, and an emergency power mode option 79. A power reserve mode option 80 is also provided, and further a plurality of selectable reserve power values 82 may also be provided on the user interface display 70.

The power mode options 77-80 are selectable by a user to engage a predefined set of power control functionality. For example, the reduced power mode option may be configured to engage the control system 11 to automatically turn off a predefined list of auxiliary devices and implement a first speed limit on the propulsion system 2, such as a vessel speed limit or a motor RPM limit. Likewise, when the emergency power mode option 79 is selected, the control system 11 may be engaged to automatically turn off a list of auxiliary devices associated with the emergency power mode and to control the propulsion system 2 so as not to exceed a second speed limit, wherein the second speed limit is even more restrictive than the first speed limit.

In certain embodiments, the user interface display 70 may be further configured such that a user can refine aspects of the instructions executed within one more of the power mode options, such as to specify one or more of the auxiliary devices that are powered down (or to specify devices that must remain powered on) and/or to adjust the respective speed limit.

The power reserve mode option 80 may be selectable to turn on or off the power reserve function. As described above, when the power reserve function is engaged, the system 11 will control power usage such that the charge level of the power storage system 16 is not permitted to fall below the reserve power amount unless a user instructs use of the reserved power. Thus, the control system 11 will actively turn off most or all of power consuming devices, including the propulsion system 2, as necessary to maintain the charge level of the power storage system 16 at least at the reserve power amount.

In certain examples, all power consuming devices other than the control system 11, and in certain embodiments also the display 40, may be turned off or severely power limited once the charge level of the power storage system 16 reaches the reserve power amount, unless and until the user has instructed use of the remaining power. In such examples, the display 40 may be operated in a limited capacity and in a minimal power consumption mode in order to effectuate the necessary control functionality described herein, including to present a reserve power utilization option to the user so that they can instruct use of the reserve power amount. For instance, in addition to being operated to provide limited user control functionality, the brightness and/or other functions of the display may be minimized to reduce power consumption.

In other embodiments, the display 40 may also be powered down and the user input to instruct utilization of the reserve power amount may be received via other means. For example, a switch or other manual input device may be provided at the helm through which the user can provide the command to utilize the reserve power amount. In other examples, a switch or other user input device to engage usage of the reserve power may be provided on the battery system housing or at another location accessible by the user.

In certain embodiments, the system 11 may be configured such that when the reserve power is being utilized, the reduced power mode or the emergency power mode is automatically engaged. In certain examples, the user interface display 70 may be configured to advise a user of the automatically-engaged power mode and/or to provide the user with selectable power mode options to control power modes and power allocation during reserve power utilization.

The user interface display 70 may further be configured to present a user with selectable reserve power values 82 selectable to set the reserve power amount. In the depicted example, the selectable reserve power values 82 are presented as a percentage of maximum usable charge capacity level of the power storage system 16, which in the example, includes 5% of total usable battery capacity, 10% of total usable battery capacity, and 15% of total usable battery capacity. For example, the usable battery capacity may be designated as the battery storage capacity within the safe operating area (SOA) prescribed for the particular LI battery.

In other embodiments, the reserve power values may be presented as an amount of energy, such as in kilowatt hours or joules, for example. In still other embodiments, the reserve power value may be presented in terms of vehicle distance, where each selectable vehicles distance is associated with an average amount of energy utilized in propelling the marine vessel 1 that distance. In certain embodiments, the energy-per-distance value may be a vessel-specific value calculated by the control system 11, such as based on energy utilized per distance unit over a predetermined period or amount of distance recently traveled. Alternatively, energy-per-distance value may be a fixed predetermined value or fixed value established upon set up of the vessel control system 11.

The system may be configured to set the reserve power amount at the prescribed values above the SOA threshold rated for the battery, such as such as a percentage or energy amount above the minimum SOA. Batteries, particularly LI batteries, have a minimum charge level that they are designed to maintain to preserve integrity of the battery cells. For many LI batteries, the SOA threshold is around 20% state of charge. In other embodiments, the reserve power amount may be measured from a different charge value, permitted to utilize a portion, or even all, of the battery power.

In certain embodiments, the control system 11 may be configured to determine a recommended reserve power amount, such as based on historical usage data for the marine vessel. Historical usage data includes information about vessel location, power utilization values and statistics (such as house load power utilization statistics and propulsion power utilization statistics), propulsion system parameters or sensed values, and any other information gathered during vessel operation that is useful for assessing or optimizing stored power utilization. For instance, the control system 11 may be configured to identify a recommended reserve power amount based on an average trip distance for the marine vessel or an average distance from shore for the marine vessel over a predetermined amount of time or number of trips. Alternatively or additionally, the control system 11 may be configured to prompt a user to input a trip route or a final destination and may calculate the reserve power amount based thereon.

Figure 4:
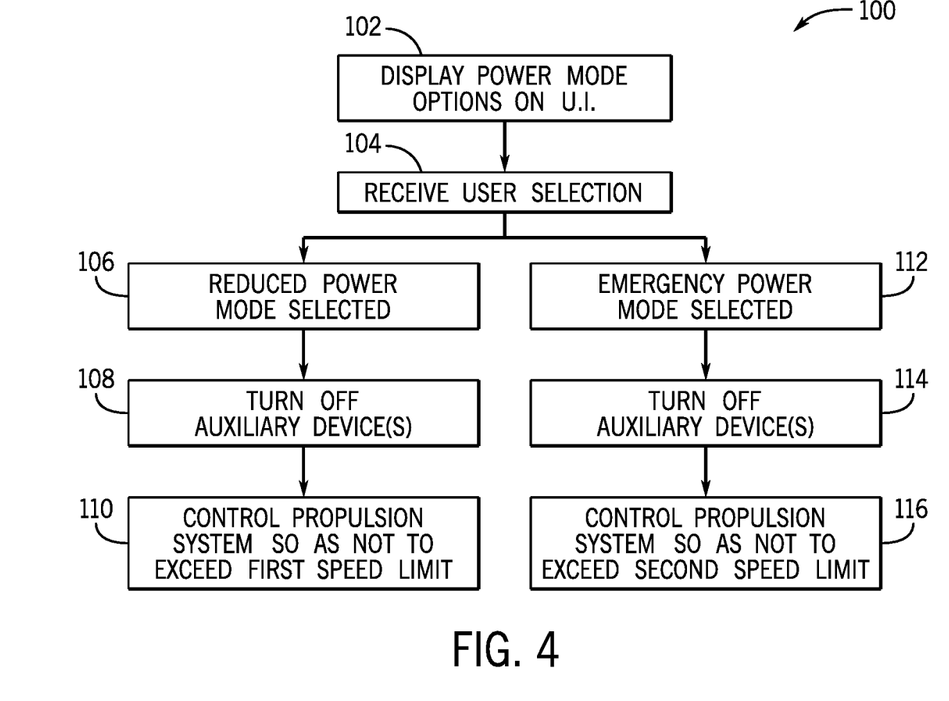
FIGS. 4-6 are flowcharts exemplifying methods, or portions thereof, for controlling an electric marine propulsion system in accordance with the present disclosure.
Figure 5:
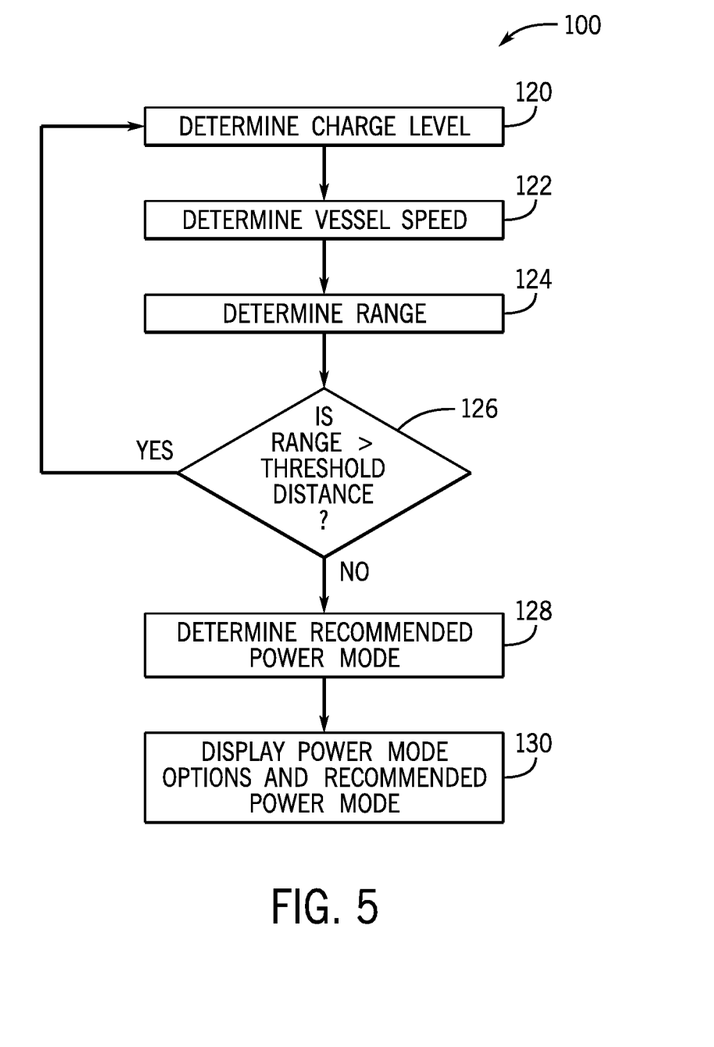
Figure 6:
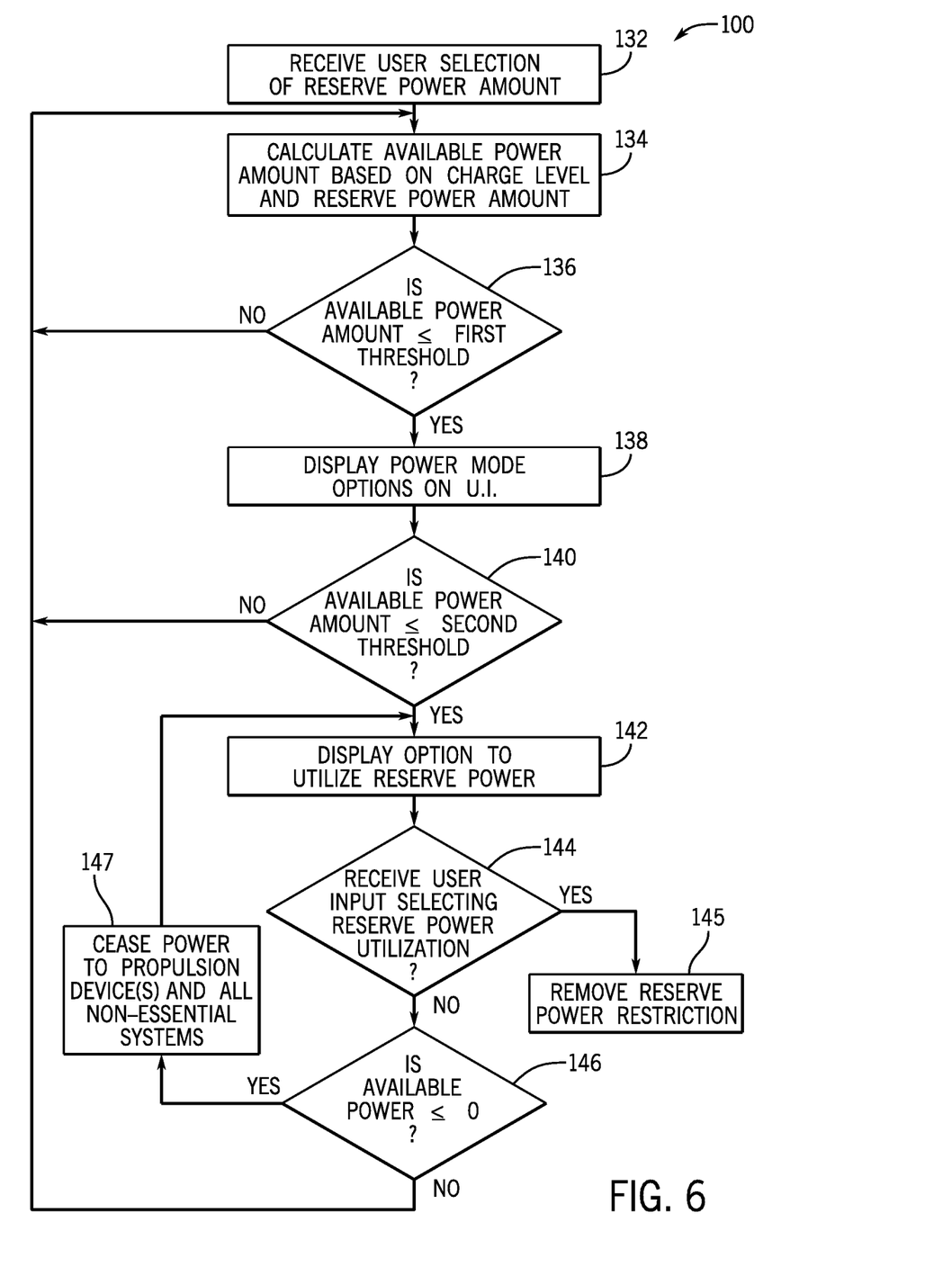

FIGS. 4-6 depict embodiments, or portions thereof, of methods 100 of controlling an electric marine propulsion system 2 to provide power mode control in accordance with the present disclosure. In FIG. 4, power mode options are displayed on a user interface display at step 102. For example, the power mode options may be displayed upon reaching an event, such as once the charge level of the battery reaches a predefined threshold, or based on detection of a threshold power consumption, such as detection of high power consumption proportional to the charge level of the power storage system 16. Displaying the power mode options on the user interface, such as the user interface display 70 exemplified at FIG. 3, may prompt a user to input a power mode selection.

The system 11 may be configured with a default power mode, such as the full power mode where no power restrictions are implemented and configured such that the default power mode remains engaged unless and until a user selection is received to engage one of the power limiting modes and/or unless and until the battery is depleted (such as to a set reserve power amount). Once a user selection of a power mode is received at step 104, the control system acts accordingly in a prescribed way to limit the power distribution.

If the reduced power mode is selected at step 106, then one or more auxiliary devices are turned off at step 108, which may be a predefined set of auxiliary devices designated for the reduced power mode, as is described above. The propulsion system is also controlled at step 110 to impose the first speed limit. As described above, the speed limit may be, for example, a vessel speed, a motor RPM, a propeller RPM, or may be a motor torque amount. If the emergency power mode is instead selected, as represented at step 112, then the designated auxiliary devices for that mode are turned off at step 114 and the propulsion system is controlled at step 116 so as not to exceed the second speed limit.

The propulsion system utilizes a tremendous amount of battery power to propel the vessel through the water, and thus changes to the power consumption by the propulsion system can significantly impact battery life. High speed propulsion not optimally efficient, and thus should be avoided when trying to optimize battery power utilization per distance.

In various embodiments, the second speed limit may be equal to or more restrictive than the first speed limit. For example, the second speed limit may be a vessel speed, motor RPM, propeller RPM, or more torque that is lower than the first speed limit. In certain examples, the second speed limit may be the optimum operation speed for the marine vessel 1 where the vessel travels the greatest distance per unit energy. Thereby, limited energy remaining in the power storage device 16 is maximized. In other embodiments, both the first and second speed limits may be set at values within an optimum efficiency range for the particular vessel and/or propulsion system configuration(s).

FIG. 5 depicts another embodiment of a method 100 of controlling a marine propulsion system for providing power mode control in accordance with the present disclosure. A charge level of the power storage system 16 is determined at step 120. For example, the charge level may be determined as a state of charge (SOC) of the one or more batteries within the power storage system 16, or by any other means or method of determining an amount of stored energy available and/or remaining within the storage system 16. Alternatively, the charge level may be determined as an average SOC, where the SOC determination is averaged over time to avoid instantaneous changes. Alternatively or additionally, the charge level may be calculated to account for the average rate of discharge of the battery at a given voltage level or SOC. For instance, a battery may discharge more quickly as it is depleted and thus the charge level determination may account for an expected discharge rate, or expected change in voltage or SOC, such as based on an expected load. To provide one example, the system may be configured to monitor the amount of power drawn by propulsion system and auxiliary devices over time and utilize that to determine the expected discharge rate. [A vessel speed of the marine vessel is determined at step 122, such as based on a GPS speed determination or based on input from a vessel speed sensor, such as a paddlewheel or pitot tube.

A range of the propulsion system is then determined at step 124 based on the vessel speed and the charge level. For example, the range may be determined assuming that the vessel will maintain current vessel speeds, or some average close thereto. Alternatively, the range of the propulsion system may be determined based on an average vessel speed, such as an average speed over a predetermined amount of time or an average speed for the trip, to provide a few examples. In a different embodiment, the range of the propulsion system may be determined based on the current charge level of the power storage system 16 and may not regard the vessel speed. For example, the range may be determined based on a predefined distance per unit charge. Since some speed sensors, such as GPS speed sensors, provide poor speed measurement accuracy at low speeds (such as below 2.5 mph), range estimations for low speed propulsion, for example, may employ such predefined values.

The range of the propulsion system is then compared to a threshold distance at step 126. For example, the threshold distance may be a predefined threshold value, such as a calibrated or pre-set value. Alternatively, the threshold distance may be defined based on user-inputted trip information, such as based on a distance to an inputted destination or a remaining distance for the entire trip. In still other embodiments, the threshold distance may be based on a vessel location, such as the distance to shore, distance to a marina, a distance from the starting location of the trip, or a distance to a "home" location defined by a user.

If the range exceeds the threshold distance, then no action is taken other than continued monitoring of the charge level and the range. Once the range becomes less than or equal to the threshold distance at step 126, then a recommended power mode is determined at step 128. For example, the recommended power mode may be determined based on the comparison between the range and the threshold distance. If, for instance, the range remains close to the threshold distance, then the system may recommend use of the reduced power mode. If, on the other hand, the range is well below the threshold distance, then the recommended power mode may be determined as emergency power mode.

In other examples, additional power modes between the reduced power mode and the emergency power mode may be provided and the recommendation may be determined based on the comparison between the range and the threshold distance according to the various limitations of the power modes. The recommended power mode is then displayed at step 130. Referring to the example at FIG. 3, certain power mode options may be highlighted as "recommended" or may be otherwise emphasized to the user in order to communicate the current power mode recommendation determined by the system.

FIG. 6 depicts another embodiment of a method 100 of controlling an electric marine propulsion system 2 to provide power mode control in accordance with the present disclosure. At step 132, user selection of a reserve power amount is received. Alternatively or additionally, the method may be triggered by user selection of the reserve power mode, which engages the system to preserve of the reserved power amount. In certain embodiments the reserve power amount may be selected by a user. Alternatively or additionally, the reserve power amount may be a predefined power amount that may or may not be adjustable by a user.

The available power amount is then calculated at step 134 based on a charge level of the power storage system 16 and the reserve power amount. For example, the available power amount may be calculated as the current charge level minus the reserve power amount. As explained herein, the current charge level may be, for example the current SOC or the current SOC minus the minimum charge dictated by the SOA designated for the battery. Thus, the available power amount is the amount of power available without utilizing the reserve power amount.

Step 136 is then executed to determine whether the available power amount is less than or equal to a first threshold power amount. If so, then the power mode options are displayed on the user interface at step 138. Thus, the first threshold power amount is at an amount of battery power or a charge level at which it would be reasonable to suggest or engage the reduced power mode (or any power mode other than the full power mode or other default power mode). The power mode options are displayed to the user in order to prompt the user to adjust their power usage behavior, select one of the power limiting mode options, or to otherwise be aware of the decreasing available power amount.

The available power amount may further be compared to a second threshold at step 140. The second threshold power amount is less than the first threshold power amount and is the power amount threshold wherein the user is presented with the option to utilized the reserve power. For example, the second threshold power amount may be where the available power is at or near zero. In other words, the charge level of the power storage system 16 is at the reserve power amount or is within a threshold amount greater than the reserve power amount.

Once the available power amount reaches the second threshold then step 142 is executed to present an option to the user, such as on the user interface display, to utilize the reserve power. The control system 11 will only permit utilization of the reserve power by the propulsion system and/or all non-essential auxiliary devices once the user has selected the reserve power utilization input.

If the user does not provide input to engage the reserve power utilization and the available power becomes less than or equal to zero at step 146, then the control system 11 will take steps to limit power consumption by all systems as much as possible. At step 147, the control system 11 effectuates a reduction or elimination of power to the propulsion system 2 and to all non-essential systems. For example, non-essential systems may be all systems on the vessel except minimal activity of the control system 11 and/or user interface 35 in order to provide minimal system control, present an alert to the user regarding the low battery state, and to receive user input selecting the reserve power utilization. In certain embodiments, the non-essential systems may also include communication systems to enable the user to radio for help and/or other essential safety systems.

Once user input is received at step 144 selecting the reserve power utilization, the reserve power restriction is removed at step 145. In certain embodiments, power limiting modes such as the reduced power or the emergency power mode may be implemented automatically when the reserve power is being utilized.

This written description uses examples to disclose the invention, including the best mode, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

We claim:

1. A method of controlling an electric marine propulsion system configured to propel a marine vessel and powered by a power storage system, the method comprising:
presenting on a user interface a plurality of power mode options selectable by a user, including at least a reduced power mode and an emergency power mode;
upon selection of the reduced power mode by the user, automatically turning off at least one auxiliary device utilizing power from the power storage system and controlling the electric marine propulsion system so as not to exceed a first speed limit; and
upon selection of the emergency power mode by the user, automatically turning off the at least one auxiliary device utilizing power from the power storage system and controlling the electric marine propulsion system so as not to exceed a second speed limit that is lower than the first speed limit.

2. The method of claim 1, wherein controlling the electric marine propulsion system so as not to exceed the first speed limit or the second speed limit includes automatically limiting an amount of power provided to the electric marine propulsion system from the power storage system.

3. The method of claim 1, wherein each of the first speed limit and the second speed limit are at least one of a motor revolutions per minute (RPM) of an electric motor in the electric marine propulsion system, a propeller RPM of a propeller in the electric marine propulsion system, or a vessel speed of the marine vessel.

4. The method of claim 1, wherein the at least one auxiliary device utilizing power from the power storage system includes a cabin lights, a bilge pump, a stereo system, a water heater, or an air conditioner.

5. The method of claim 1, further comprising:
prior to presenting the plurality of power mode options on the user interface:
determining a charge level of the power storage system;
determining a vessel speed;
determining a range of the electric marine propulsion system based on at least the charge level and the vessel speed;
comparing the range to a threshold distance; and
presenting the plurality of power mode options on the user interface only if the range is less than the threshold distance.

6. The method of claim 5, further comprising:
based on the comparison, determining a recommended power mode, wherein the recommended power mode is one of at least a full power mode, the reduced power mode, and the emergency power mode; and
presenting the recommended power mode to the user on the user interface.

7. The method of claim 5, further comprising determining a distance to a predetermined location, wherein the threshold distance is based on the distance to the predetermined location.

8. The method of claim 1, further comprising reserving a reserve power amount such that a charge level of the power storage system is not permitted to fall below the reserve power amount unless the user instructs use of the reserve power amount.

9. The method of claim 8, further comprising presenting on the user interface at least one reserve power value selectable by a user to set the reserve power amount.

10. The method of claim 9, further comprising presenting the at least one reserve power value as a percentage of a maximum usable charge capacity of the power storage system.

11. The method of claim 8, further comprising presenting a reserve power utilization option on the user interface selectable to instruct use of the reserve power amount when the charge level is less than a threshold amount greater than the reserve power amount.

12. The method of claim 8, further comprising presenting on the user interface a reserve power mode selectable by the user;
upon selection of the reserve power mode, engaging reservation of the reserve power amount and determining an available power amount as the charge level of the power storage system minus the reserve power amount; and
displaying the available power amount on the user interface.

13. The method of claim 8, further comprising determining a recommended power mode based on the charge level and the reserve power amount and presenting the recommended power mode on the user interface.

14. The method of claim 8, further comprising determining a recommended reserve power amount based on historical usage data for the marine vessel and displaying the recommended reserve power amount on the user interface.

15. An electric marine propulsion system configured to propel a marine vessel, the system comprising:
a power storage system;
an electric motor powered by the power storage system;
a user interface display;
a control system configured to:
present on the user interface display a plurality of power mode options selectable by a user, including at least a reduced power mode and an emergency power mode;
upon selection of the reduced power mode by the user, turn off at least one auxiliary device utilizing power from the power storage system and automatically control the electric marine propulsion system so as not to exceed a first speed limit; and
upon selection of the emergency power mode by the user, turn off the at least one auxiliary device utilizing power from the power storage system and automatically control the electric marine propulsion system so as not to exceed a second speed limit that is lower than the first speed limit.

16. The system of claim 15, wherein the control system is further configured to:
determine a charge level of the power storage system;
determine a vessel speed;
determine a range of the electric marine propulsion system based on at least the charge level and the vessel speed;
compare the range to a threshold distance;
determine a recommended power mode based on the comparison, wherein the recommended power mode is one of at least a full power mode, the reduced power mode, and the emergency power mode; and display the recommended power mode to the user on the user interface.

17. The system of claim 16, wherein the control system is further configured to determine a distance to a predetermined location and set the threshold distance as the distance to the predetermined location.

18. The system of claim 15, wherein the control system is further configured to reserve a reserve power amount such that a charge level of the power storage system is not permitted to fall below the reserve power amount unless the user instructs use of the reserve power amount.

19. The system of claim 18, wherein the control system is further configured to determine an available power amount as the charge level minus the reserve power amount and display the available power amount on the user interface.

20. The system of claim 18, wherein the control system is further configured to display on the user interface at least one reserve power value selectable by a user to set the reserve power amount.

21. The system of claim 18, wherein the control system is further configured to present an option on the user interface to instruct use of the reserve power amount when the charge level is less than a threshold amount greater than the reserve power amount.

22. The system of claim 18, wherein the control system is further configured to determine a recommended power mode based on the reserve power amount.

23. The system of claim 18, wherein the control system is further configured to determine a recommended reserve power amount based on historical power usage traveling between a first predetermined location and a second predetermined location.

* * * * *